United States Patent [19]
Jeon

[11] Patent Number: 5,457,773
[45] Date of Patent: Oct. 10, 1995

[54] ROBOT ACTUATOR POSITION CONTROL METHOD

[75] Inventor: Jae W. Jeon, Suwon, Rep. of Korea

[73] Assignee: Samsung Electronics Co., Ltd., Suwon, Rep. of Korea

[21] Appl. No.: 304,218

[22] Filed: Sep. 12, 1994

Related U.S. Application Data

[63] Continuation of Ser. No. 99,330, Jul. 30, 1993, abandoned.

[30] Foreign Application Priority Data

Aug. 13, 1992 [KR] Rep. of Korea ............... 92/14585

[51] Int. Cl.$^6$ .............. G05B 19/42; G05B 19/00
[52] U.S. Cl. .............. 395/89; 318/568.13; 901/3
[58] Field of Search .............. 395/80, 82, 85, 395/86, 88, 89, 99; 318/568.13, 568.14, 568.15; 901/3, 4, 5

[56] References Cited

U.S. PATENT DOCUMENTS

| | | | |
|---|---|---|---|
| 4,011,437 | 3/1977 | Hohn | 395/82 |
| 4,187,051 | 2/1980 | Kirsch et al. | 395/94 |
| 4,287,459 | 9/1981 | Dahlström | 395/88 |
| 4,380,696 | 4/1983 | Masaki | 395/88 |
| 4,558,424 | 12/1985 | Oguchi et al. | 395/86 |
| 4,562,551 | 12/1985 | Inoba et al. | 318/568.13 |
| 4,571,694 | 2/1986 | Inoba et al. | 395/88 |
| 4,595,989 | 6/1986 | Yasukawa et al. | 901/4 |
| 4,659,971 | 4/1987 | Suzuki et al. | 318/568.19 |
| 4,694,232 | 9/1987 | Suzuki et al. | 901/3 |
| 4,738,015 | 4/1988 | Kato | 29/407 |
| 4,912,383 | 3/1990 | Takeyama et al. | 395/80 |
| 5,079,491 | 1/1992 | Nose et al. | 395/99 |

Primary Examiner—Robert W. Downs
Attorney, Agent, or Firm—Burns, Doane, Swecker & Mathis

[57] ABSTRACT

A workpiece is picked up by a robot actuator and transferred to an intermediate position relative to an objectpiece. The robot actuator then transfers the workpiece from the intermediate position to a predetermined location on the objectpiece. The movement of the robot actuator to the intermediate position is made on the basis of coordinate data of the intermediate position stored in a control system which controls the movement of the robot actuator. During transfer of the workpiece from the intermediate position toward the predetermined location, a determination is made as to whether the movement of the workpiece occurs for a predetermined time period. If the determination is negative, then it is concluded that the workpiece has not reached the predetermined location and the operation is shut down. If the determination is positive, then it is concluded that the workpiece has reached the predetermined location, and the coordinates of the workpiece at that predetermined location are used to define the intermediate position for the transfer of the next workpiece. That is done by resetting the coordinates for the intermediate position in the control system in accordance with the coordinates of the workpiece in the predetermined location.

5 Claims, 6 Drawing Sheets

ROBOT ACTUATOR POSITION CONTROL METHOD

This application is a continuation of application Ser. No. 08/099,330, filed Jul. 30, 1993, now abandoned.

BACKGROUND OF THE INVENTION

Field of the Invention

The present invention is related to a robot actuator position control method, and particularly to a robot actuator position control method for setting coordinate data for a target position of the actuator at each assembly operation in the course of assembling a workpiece into an objectpiece transferred by an assembly line.

Description of the Prior Art

In order to move the center point of the workpiece to a desired position by a robot hand or arm (hereinafter, called an actuator), the coordinate data for the desired position should be determined prior to a specific assembly operation.

In one method for determining the coordinate data for the desired position, an operator may move the actuator of the robot to the desired position by means of a teaching box, and then set the coordinate data for the position (hereinafter, called a target position) at which the actuator is currently located. Another method for determining the coordinate data for the target position is for the operator to set the coordinate data for the target position in the form of numeral data or a robot language by means of a key board input device. The operator may also determine the coordinate data for the target position by setting the coordinate data by means of another system and then transmitting the coordinate data to the robot system.

The coordinate data for the target position of the robot actuator set by the methods described above are maintained until an error in the assembly operation is detected.

However, there is a problem in that when there is a defect in the robot mechanism or the controller for the robot system, an undesirable deviation may occur between the target position and the actual position of the actuator of the robot. When this occurs, it becomes necessary to again set the coordinate data for the target position for the actuator and this interrupts the assembly operation.

On the other hand, a deviation between the target position for the objectpiece and the actual position to which the objectpiece is transferred by the assembly line may also occur due to a defect in the robot mechanism or the robot system controller. Accordingly, when both deviations described above occur concurrently, the entire deviation exceeds an acceptable limit for the robot system, thereby frequently interrupting the assembly operation.

A typical example of prior art for a robot position control system is disclosed in U.S Pat. No. 4,659,971. The invention disclosed in the U.S Patent has an object to substantially simplify the operation for specifying the operating position and the actuator direction when an operation is carried out at a plurality of operating positions of the same member to be assembled placed in a plurality of places in the same robot system. However, a method for reducing errors in the assembly operation due to a defect in the robot mechanism or the robot system controller is not disclosed in the U.S Patent.

SUMMARY OF THE INVENTION

It is an object of the present invention to provide a robot actuator position control method for determining coordinate data for a target position of the actuator at each assembly operation in the course of assembling a workpiece into an objectpiece transferred by an assembly line, thereby preventing interruptions in the assembly operation.

The robot actuator position control method according to the present invention includes the steps of setting the coordinate data for a target position for a workpiece to be transferred by an actuator; transferring the workpiece to the target position; assembling the workpiece into the objectpiece when the deviation value between the target position for the workpiece and the position to which the workpiece is actually transferred is within an acceptable limit, and then again setting the coordinate data for the target position as the coordinate data for the position to which the workpiece is currently positioned; and, stopping the assembly operation when the deviation value between the target position for the workpiece and the position to which the workpiece is actually transferred exceeds the acceptable limit, and then issuing an alarm that the coordinate data for the target position for the workpiece needs to be set again.

BRIEF DESCRIPTION OF THE DRAWINGS

These and other aspects of the present invention are clarified by reference to the accompanying drawings in which:

FIG. 1 is a diagram showing the process by which the robot assembles the workpiece into the objectpiece, in which

DETAILED DESCRIPTION OF THE PREFERRED EMBODIMENT

Hereinafter, the preferred embodiment of the present invention will be described in detail with reference to the accompanying drawings.

Figure 1A:
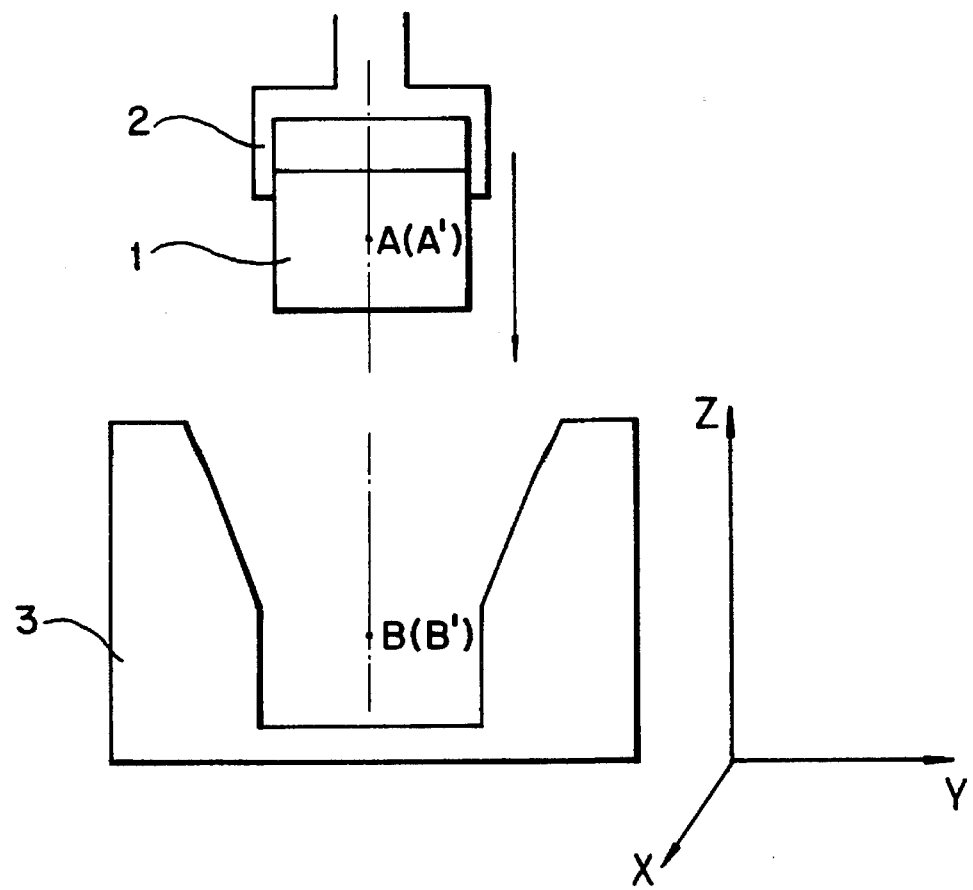
FIG. 1A shows the condition wherein the workpiece and the objectpiece are located at the same vertical line.
Figure 1B:
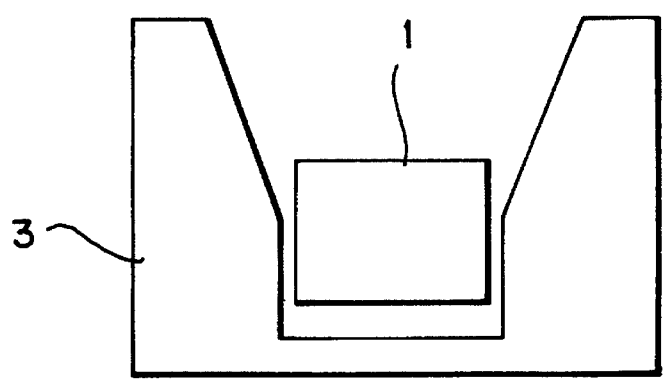
FIG. 1B shows the condition wherein the workpiece is inserted into the objectpiece along the vertical line.

Referring to FIG. 1A, the workpiece 1 to be assembled into the objectpiece 3 is grasped by the actuator 2 of the robot. The workpiece is then transferred to an actual intermediate position A' by the actuator 2, and the objectpiece 3 is transferred to an actual intermediate position B' by a conveying mechanism (not shown). It is preferred that those actual intermediate positions A', B' coincide with target intermediate positions A,B as shown in FIG. 1A. The target position A corresponds to certain coordinate data, for example the rectangular coordinate data (X,Y,Z), established in the system controller. FIG. 1A shows the condition wherein the workpiece 1 and objectpiece 3 have been respectively transferred to actual intermediate positions (A', B') which coincide with the target intermediate positions (A,B). In the condition shown in FIG. 1A, if the workpiece 1 is transferred downward along a vertical line by the actuator 2, the workpiece 1 is exactly inserted into the objectpiece 3 as shown in FIG. 1B.

Figure 2:
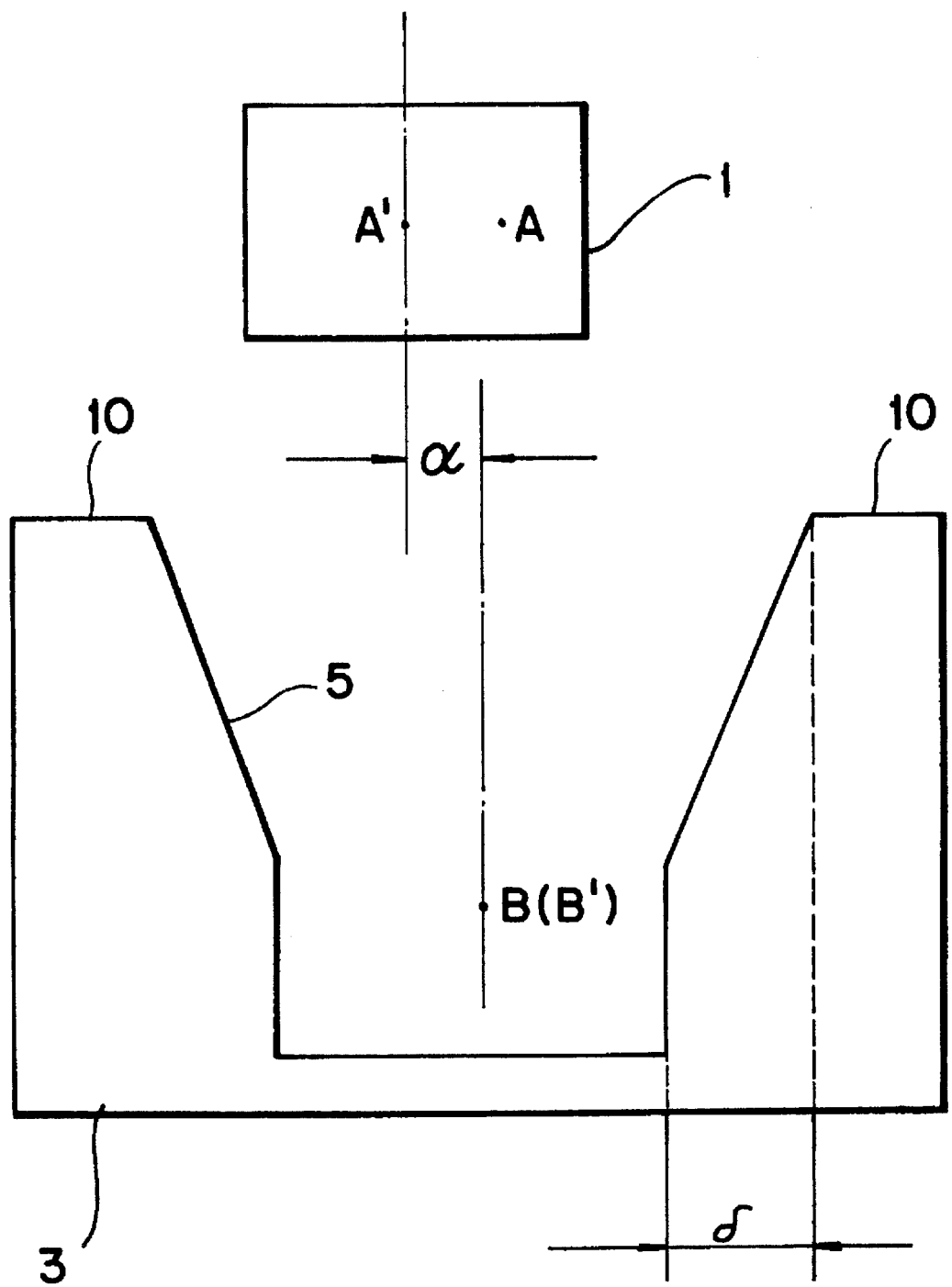
FIG. 2 is a diagram showing the condition wherein the workpiece is transferred with a deviation from the target position thereof.

However, for various reasons, the workpiece 1 might instead be transferred such that there exists a deviation between the target intermediate position and the actual intermediate position thereof as shown in FIG. 2. The deviation may be externally caused by variations in the voltage supplied to the robot system, and may be internally caused by noise signals which occur in the electronic circuits of the robot system.

Taking into consideration the occasional deviations caused by those external and internal causes, the objectpiece 3 is generally designed to have tapered surfaces 5, as shown in FIG. 2, which allow the workpiece 1 to slip into its proper position in the objectpiece 3, when the deviation ($\alpha$) of the center position (A') from the target intermediate position (A) is within the acceptable limit ($\delta$) of the objectpiece 3 as shown in FIG. 2.

Figure 3:
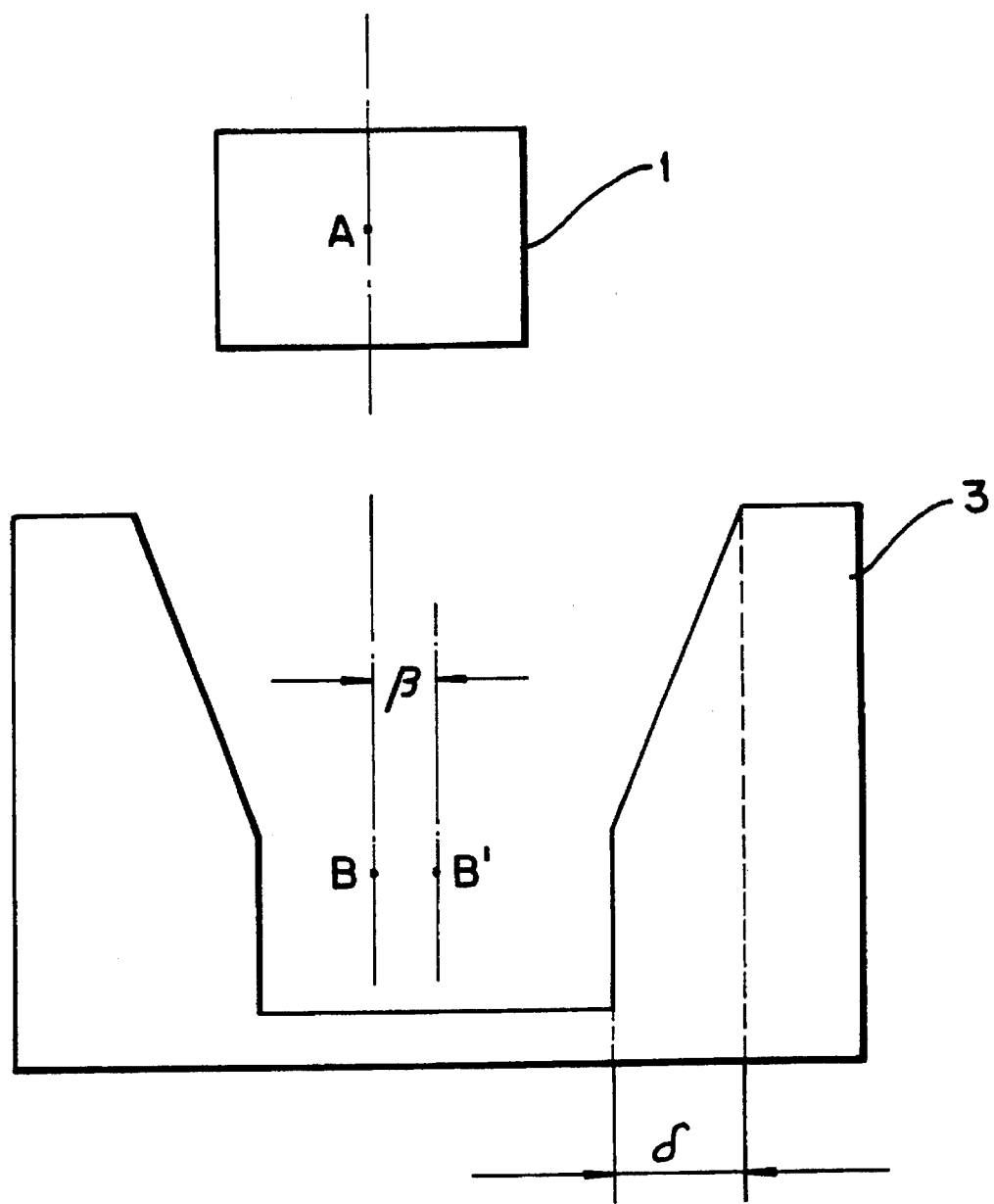
FIG. 3 is a diagram showing the condition wherein the objectpiece is transferred with a deviation from the target position thereof.

On the other hand, the objectpiece 3 may also be transferred with a deviation ($\beta$) between the actual intermediate position (B') and the target intermediate position (B), as shown in FIG. 3, caused by the internal and external causes described above. Even in this condition, the workpiece 1 is effectively assembled into the objectpiece 3, if the deviation ($\delta$) is within the acceptable limit ($\delta$).

Figure 4:
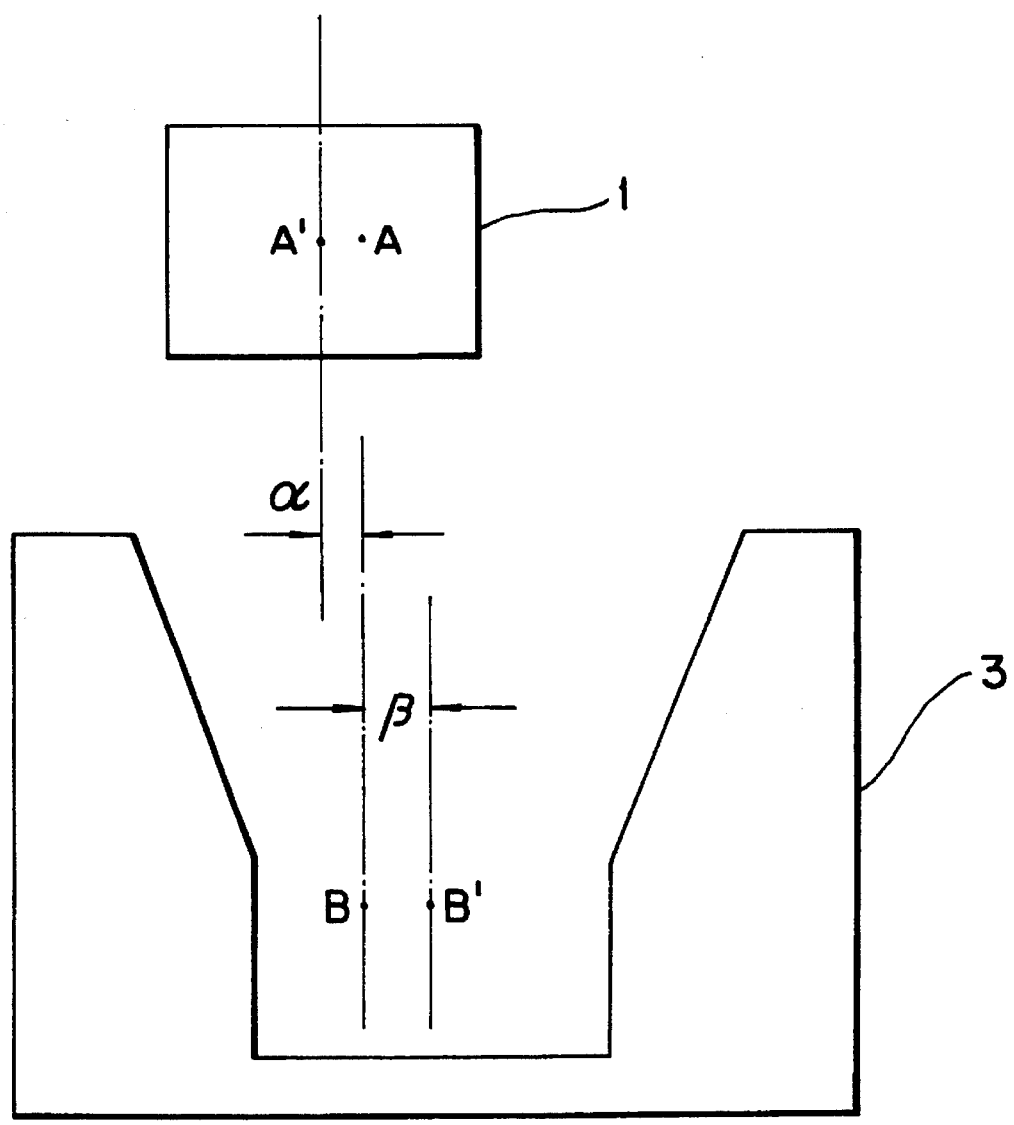
FIG. 4 is a diagram showing the condition wherein both the workpiece and objectpiece are transferred with respective deviations from the respective target position; and, FIGS. 5A and 5B are a flow chart showing the robot actuator position control method according to the present invention.

Furthermore, the workpiece 1 and objectpiece 3 may also be transferred with the respective deviation ($\alpha,\beta$) between the respective actual temperature position (A',B') and the respective target intermediate position (A, B ) as shown in FIG. 4. Even in this condition, the workpiece 1 is effectively assembled into the objectpiece 3, if the sum ($\alpha+\beta$) of the respective deviation ($\alpha, \beta$) is within the acceptable limit ($\delta$). However, the workpiece 1 cannot be assembled into the objectpiece 3, if the respective deviation ($\alpha,\beta$) or the sum ($\alpha+\beta$) of the respective deviation ($\alpha, \beta$) exceeds the acceptable limit ($\delta$).

Hereinafter, the robot actuator position control method will be described in reference to FIG. 5.

Figure 5A:
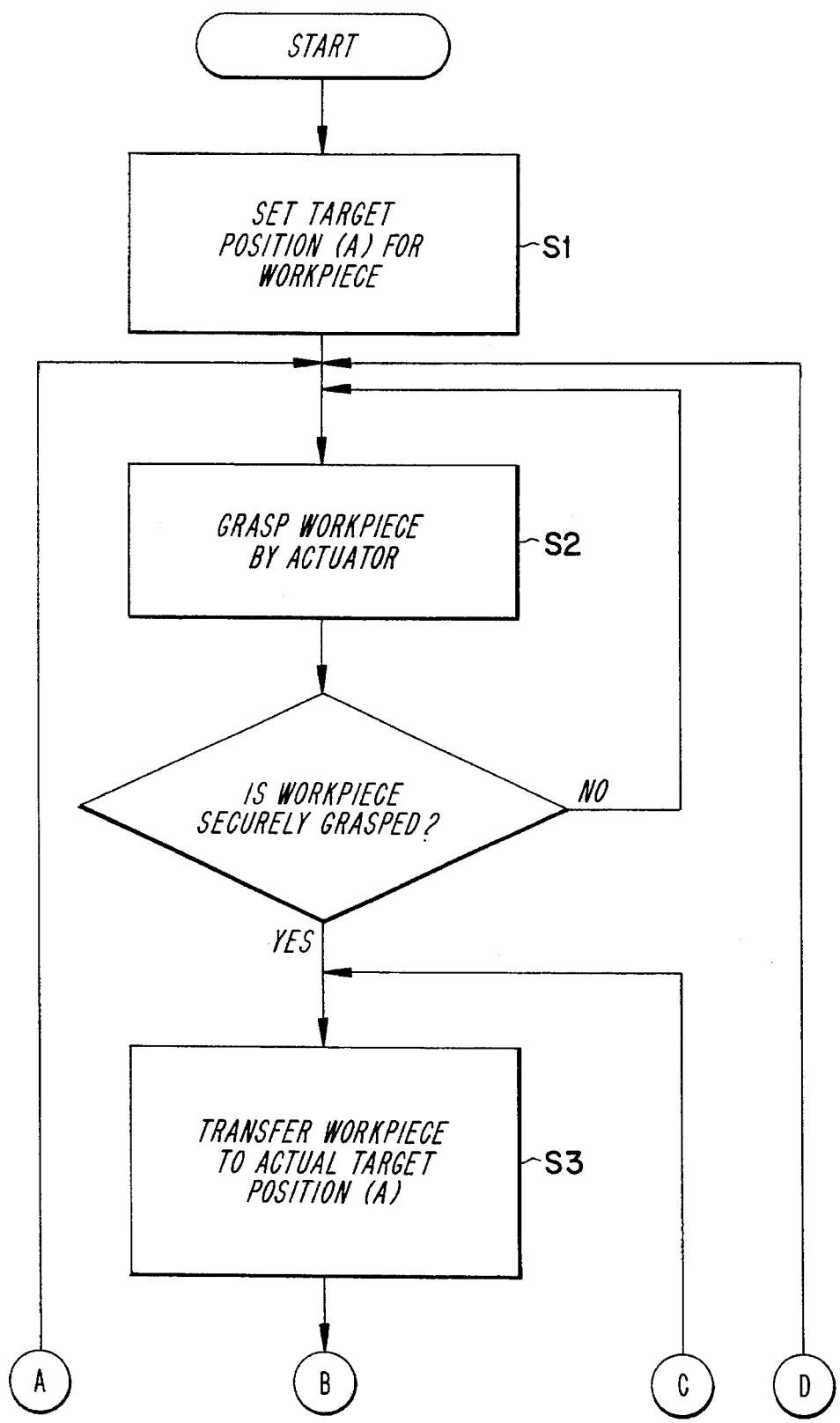
Figure 5B:
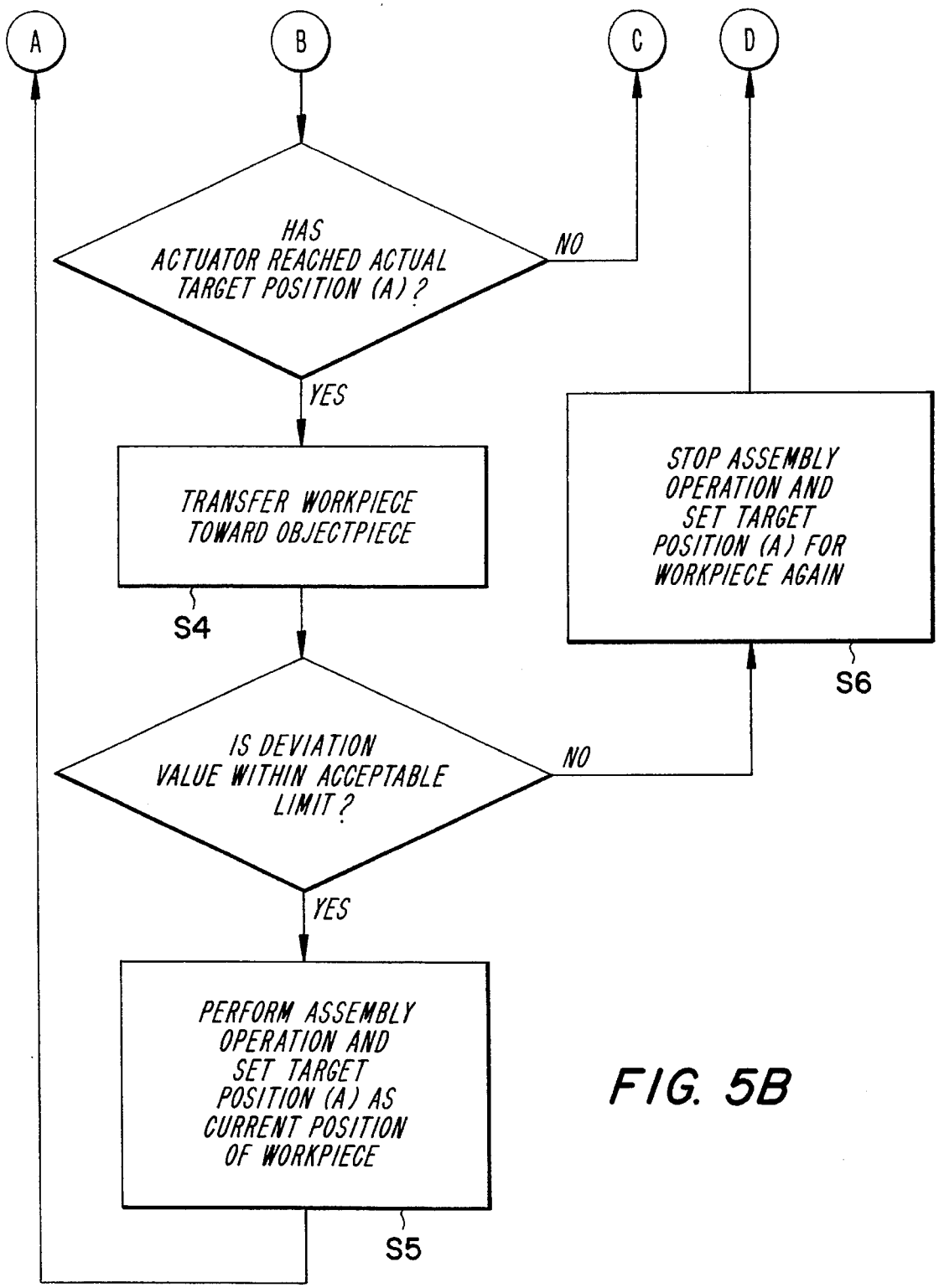

Referring to FIG. 5, in step S1 an operator initially sets coordinate data to the system controller, not shown, for the target intermediate position (A) to which the actuator 2 is supposed to transfer the grasped workpiece 1.

In step S2, the robot actuator 2 grasps the workpiece 1. It is then determined whether or not the workpiece 1 has slipped from the grasp of actuator 2 by determining whether the coordinate value for the Z axis for the actuator 2 has changed for a predetermined time from the time that the actuator 2 grasped the workpiece 1. If it is determined that the workpiece 1 has slipped from the grasp of actuator 2, the process returns to step 2 again, and then the robot actuator 2 grasps the workpiece 1 again. When the grasping operation is completed, the robot actuator 2 transfers the workpiece 1 to the actual intermediate position (A) in step S3 which preferably coincides with its target intermediate position A 3. It is then determined whether or not the! actuator 2 has reached the target intermediate position (A). If it is determined that the actuator 2 has reached the target intermediate position (A), The robot actuator 2 then attempts to assemble the workpiece 1 into the objectpiece 3 in step S4. If the deviation value ($\alpha$) between the target intermediate position (A) and the current actual intermediate position (A') of the workpiece 1, or the deviation value ($\beta$) between the target intermediate position (B) and the current actual intermediate position (B') of the objectpiece 3, or the sum ($\alpha+\beta$) of the respective deviation values ($\alpha,\beta$) is within the acceptable limit ($\delta$), then workpiece 1 will be effectively assembled into the objectpiece 3 during step S4, whereafter step S5 will be performed. In step S5 the system controller adopts the coordinate data for the position where the workpiece 1 is currently located as the coordinate data for the target intermediate position (A). That is, since the workpiece has been properly assembled, it can be ensured that its current (assembled) location along the Y axis will be an acceptable value for use as the target intermediate position for subsequent operations, so the current coordinate of the workpiece along the Y axis is now adopted by the system controller as the coordinate for the target intermediate position.

If, however, the workpiece is not properly assembled, the process does not proceed to step S5, but rather to step S6 (to be later described). That is, if the respective deviation value ($\alpha,\beta$), or the sum ($\alpha+\beta$) of those values is not within the permitted limit 6, then during step S4 the workpiece will not be properly inserted into the objectpiece. The determination of whether or not the respective deviation value ($\alpha,\beta$) or the sum ($\alpha+\beta$) of the respective values ($\alpha,\beta$) was within the permitted limit ($\beta$) can be made by determining whether the workpiece fails to reach its proper position in the objectpiece. That is to say, if it is determined that the workpiece fails to reach such a position, it can be concluded that the deviation along the Y axis exceeded the permitted limit, whereby, for example, the workpiece engaged a top face 10 of the objectpiece and was prematurely stopped. This determination can be made by sensing whether the actuator 2 moves along the Z axis for a predetermined time period starting from the moment when the actuator 2 begins to transfer the workpiece downwardly into the objectpiece 3. That is, when the changing of that coordinate value occurs for a predetermined time, it is determined that the respective deviation value ($\alpha,\beta$) or the sum ($\alpha+\beta$) of the respective deviation value ($\alpha,\beta$) is within the acceptable limit ($\delta$). The system controller then adopts the coordinate data of the position where the workpiece 1 is currently located as the coordinate data for the target position (A) in step S5 as pointed out earlier. On the other hand, if the changing of the coordinate value does not occur for the predetermined time period, then it is determined that the workpiece was not effectively assembled into the workpiece, i.e., it is determined that the respective deviation value ($\alpha,\beta$) or the sum ($\alpha+\beta$) of the respective deviation values ($\alpha,\beta$) exceeds the acceptable limit ($\beta$). The process then goes to step S6 wherein the system controller stops the assembly operation, and then issues an alarm indicating that the coordinate data for the target position (A) for the workpiece 1 needs to be set again. The operator may then set the coordinate data for the target position (A) for the workpiece 1 according to the alarm message.

I claim:

1. A method of controlling the movement of a robot actuator during the positioning of workpieces onto respective objectpieces at an objectpiece target zone, whereby each objectpiece receives a single one of said workpieces at said objectpiece target zone, comprising the steps of:

A) transferring a first workpiece to an intermediate position relative to said objectpiece target zone, on the basis of coordinate data of said intermediate position stored in a control system for said robot actuator;

B) moving a first objectpiece to said objectpiece target zone;

C) moving said first workpiece from said intermediate position at least generally toward a predetermined location on said first objectpiece, and causing said first workpiece to engage a chamfer bordering said predetermined location for deflecting said first workpiece in the direction of said predetermined location when said first workpiece is out of alignment with said predetermined location;

D) determining whether said first workpiece has reached said predetermined location on said first objectpiece;

E) upon determining from step C that said first workpiece has reached said predetermined location, supplying said control system with coordinate data corresponding to said predetermined location;

F) setting the coordinate data of said intermediate position in said control system for the transfer of a second workpiece thereto, in accordance with coordinate data of said predetermined location supplied in step E;

G) moving said first objectpiece out of said objectpiece target zone upon transference of said first workpiece thereto, and moving a second objectpiece into said objectpiece target zone; and H) repeating steps A–F with respect to said second workpiece for transferring said second workpiece to said second workpiece at said predetermined location.

2. A method according to claim 1, including prior to step E, the step of stopping the robot actuator and signaling that the coordinate data for said intermediate position must be reset upon determining from step D that said first workpiece has not reached said predetermined location on said first objectpiece.

3. A method according to claim 1, wherein step D comprises sensing whether movement of said first workpiece from said intermediate position to said predetermined location on said first objectpiece during step C occurs for a predetermined time period.

4. A method according to claim 3, wherein step A comprises transferring said first workpiece to said intermediate position located vertically above said first objectpiece, and step C comprises moving said first workpiece downwardly from said intermediate position toward said predetermined location on said first objectpiece.

5. A method according to claim 1, wherein each of steps B and G includes moving said first objectpiece along an assembly line. REMARKS Reconsideration of the present application is respectfully requested.

Claim 3 has been amended to clarify the fact that each objectpiece receives a single workpiece at the objectpiece target zone, thereby distinguishing over the Suzuki et al patent which is directed specifically to the stacking (or unstacking) of a plurality of workpieces 5 onto (or from) a magazine. There is no suggestion of a method involving the transfer of workpieces onto respective objectpieces so that each objectpiece receives only a single workpiece before being moved out of the objectpiece target zone.

\* \* \* \* \*